April 27, 1937.  E. L. HARDER  2,078,664
POTENTIAL SUPPLY SYSTEM
Filed Feb. 20, 1936
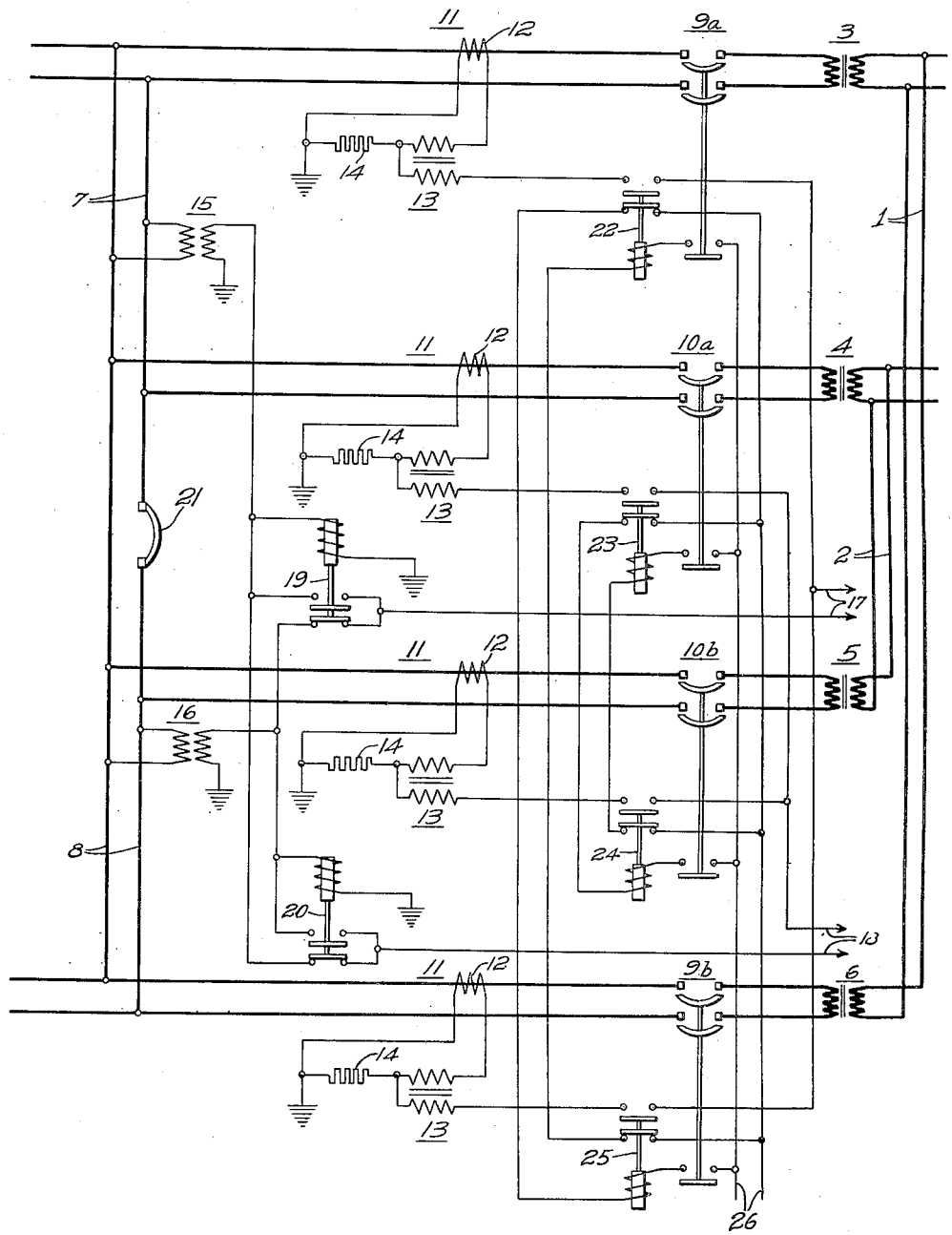
WITNESSES:
C. J. Weller.
C. O. Harrison
INVENTOR
Edwin L. Harder.
BY
ATTORNEY Patented Apr. 27, 1937

2,078,664

UNITED STATES PATENT OFFICE 2,078,664

POTENTIAL SUPPLY SYSTEM

Edwin L. Harder, Forest Hills, Pa., assignor to Westinghouse Electric & Manufacturing Company, East Pittsburgh, Pa., a corporation of Pennsylvania Application February 20, 1936, Serial No. 64,877

6 Claims. (Cl. 172—237)

My invention relates to potential supply apparatus for use in alternating-current systems of transmission and distribution, and particularly to such apparatus of the type in which voltage conditions existing on the high-voltage sides of power transformers are reproduced for purposes of metering by means of quantities derived from the low-voltage circuits of the transformers. In such potential supply apparatus, it is usual to provide compensating devices which are energized in accordance with the power currents carried by the transformers, to produce voltages proportional to, and in phase with, the losses of voltage in the power transformer windings caused by impedance effects. Where a number of power transformers are connected to the same high-voltage circuit, it is desirable to provide a number of such compensating devices and to provide a suitable control system for maintaining energization of the potential buses when the normal transformer connections are interrupted and some form of emergency connections established.

It is an object of my invention to provide a novel system of a plurality of compensating devices, as used with a plurality of power transformers, arranged to maintain an uninterrupted potential supply derived from any of the power transformers in suitable condition for supplying potential, even though transformers are from time to time switched into or out of connection with the power circuits.

Another object of my invention is to provide a novel potential supply system of the type indicated above, in which the transfer of the potential buses to suitable energizing circuits may be effected automatically in accordance with electrical conditions derived from the main power circuits.

Other objects of my invention will become evident from the following detailed description taken in conjunction with the accompanying drawing, in which the single figure is a schematic view of a potential supply system embodying my invention.

Referring to the drawing, a high voltage bus 1 is connected by means of a plurality of power transformers 3 and 6 to a pair of secondary buses 7 and 8. A pair of circuit breakers 9a and 9b are provided for controlling the flow of power through the transformers 3 and 6. A second high-voltage bus 2 is similarly connected by means of power transformers 4 and 5, controlled by a pair of circuit breakers 10a and 10b, to the secondary buses 7 and 8. The circuit breakers 9a, 9b, 10a and 10b are arranged so that connections may be established to either of the secondary buses 7 or 8 from either of the high voltage buses 1 or 2.

For purposes of illustration it may be considered that the high voltage buses 1 and 2 are supplied at transmission voltages from a suitable source (not shown), and that the secondary buses 7 and 8 are connected to distribution feeders for electric railway circuits, operating at voltages of the order of 12Kv. However, the invention is equally applicable to circuits connected in various other ways and operating at entirely different voltages, regardless of whether such circuits normally carry power in one direction only, or the direction of power flow is reversible.

A compensating device 11 is connected in series with each of the power transformers 3, 4, 5 and 6 for producing a voltage proportional to, and in phase with, the voltage loss in the corresponding power transformer caused by the flow of power currents in the current transformer impedances. Each of the compensating devices 11 consists of a current transformer 12 connected in the secondary leads of the corresponding power transformer, a mutual impedance section 13 and a resistance section 14. Although, for simplicity, the devices 11 have been shown without various refinements and adjustments familiar to those skilled in the art, it will be understood that in a practical embodiment of the invention, a more complicated form of compensating device 11 would be utilized.

A pair of potential transformers 15 and 16 are provided for cooperating with the compensating devices 11 in maintaining energization of the potential buses 17 and 18. It will be understood that the potential transformers 15 and 16 supply components of voltage proportional to the secondary voltage of the power transformers 3, 4, 5 or 6, and the compensating devices 11 produce components of voltage proportional to the losses of voltage in the power transformers, so that the total of voltage components applied to the potential buses 17 or 18 is proportional to the voltage of the high-voltage buses 1 or 2. In order to permit convenient transfer of all of the potential devices 11 and both potential transformers 15 and 16 into and out of circuit with the potential supply buses 17 and 18, a point of common potential is maintained by a common connection, preferably through ground, as illustrated.

The compensating devices 11 may be regarded as series connected mutual impedance elements which produce voltages dependent upon the currents traversing the corresponding power circuits. Similarly, the potential transformers 15 and 16 may be regarded as shunt connected mutual impedance elements which produce voltages dependent upon the voltages of the power circuits with which they are associated. Obviously, other forms of mutual impedance elements may be substituted for the devices 11 or potential transformers 15 or 16 where the nature of the installation permits.

The compensating devices 11 are each designed and adjusted in accordance with the impedance characteristics of the corresponding power transformers 3, 4, 5 or 6, to produce a voltage equal in magnitude and corresponding in phase angle, to the impedance voltage loss in the corresponding power transformer, multiplied by a constant factor. The latter constant factor is determined by the turn ratios of the power transformers 3, 4, 5 and 6 and of the potential transformers 15 and 16, the impedance of the potential transformers 15 and 16 and the impedance of the burden, in accordance with the principles explained in my copending application, Serial No. 52,122, filed November 29, 1935, and assigned to the Westinghouse Electric & Manufacturing Company. For purposes of the present invention, the effect of the burden impedance may be considered negligible, in which case, the constant factor referred to above becomes the product of the turn ratio of the power transformers 3, 4, 5 or 6 and the turn ratio of the potential transformers 15 or 16.

The potential bus 17 is connected to a bank of meters (not shown) for measuring various electrical quantities, such as real or reactive power supplied by the high-voltage bus 1. The potential bus 18 is similarly connected to a bank of meters (not shown) for measuring electrical quantities of the high-voltage bus 2.

A pair of transfer relays 19 and 20 are provided for controlling the connection of the potential transformers 15 and 16 to the potential supply buses 17 and 18, in accordance with the condition of energization of the latter transformers, when the secondary buses 7 and 8 are disconnected from each other. A tie circuit breaker 21 is provided for controlling the connection of the secondary buses 7 and 8.

The transfer relays 19 and 20 are designed to indicate merely an energized or deenergized condition of the corresponding potential transformers 15 and 16, and may, accordingly, operate at any of a wide range of voltage values. For purposes of illustration it will be assumed that the relays 19 and 20 close at a voltage of approximately 70% of the normal secondary voltage of the potential transformers 15 and 16, and drop out at a voltage of 50% of the normal secondary voltage of the transformers 15 and 16.

A set of control relays 22, 23, 24 and 25 is provided for controlling the connections of the compensating devices 11 to the potential supply buses 17 and 18. The control relays 22, 23, 24 and 25 are energized from a suitable source of potential such as a direct-current control potential bus 26, and are connected with auxiliary contacts of the circuit breakers 9a, 9b, 10a and 10b in such manner that closure of any of the circuit breakers 9a, 9b, 10a or 10b effects closure of one of the control relays 22, 23, 24 or 25, but that only one of the relays of the group consisting of relays 22 and 25 can be closed at any time, and only one of the relays of the group consisting of relays 23 and 24 can be closed at a given time.

The operation of the above described apparatus may be set forth as follows: Assuming that high-voltage buses 1 and 2 are energized, and that the various circuit breakers and relays are in the positions shown in the figure, the secondary buses 7 and 8 may be energized by closing any of the circuit breakers 9a, 9b, 10a or 10b. If the circuit breaker 9a is closed, for example, an energizing circuit to the secondary bus 7 is completed through the transformer 3 and the contacts of the circuit breaker 9a. Upon closure of the circuit breaker 9a, a circuit is completed for the control relay 22, and the latter closes, establishing a circuit from the upper compensating device 11 to the potential supply bus 17. Upon energization of the secondary bus 7, the relays 19 and 20 close to provide a main component of energization for the potential supply buses 17 and 18.

As the voltage components supplied to the potential bus 17 by the potential transformer 15 and the compensating device 11 are proportional to the secondary voltage and impedance drop of the transformer 3, the total voltage of the potential bus 17 is proportional to the voltage of the high-voltage bus 1. As both the relays 23 and 24 remain open, the energizing circuit for the potential bus 18 is open and the latter bus remains deenergized.

If, without other change of the circuits, the tie bus 21 is opened, the secondary bus 8 becomes deenergized, and, as potential is no longer available for the energization of the transfer relay 20, the latter relay drops out, interrupting the energizing connection for the potential bus 18. The potential bus 18, of course, remains deenergized, as its energizing circuit has not yet been completed.

As long as the circuit breaker 9a remains closed, the control relay 22 interrupts the energizing circuit for the control relay 25, so that the latter relay cannot be closed, even though the circuit breaker 9b should close subsequently. If, however, the circuit breaker 9a is opened, the relay 22 drops out, and either relay 22 or 25 may be closed depending upon which of the circuit breakers 9a or 9b is closed first. It will be seen, therefore, that the main component of potential supplied to the potential supply bus 17 is furnished from the high voltage bus 1 through either of the transformers 3 or 6 whose secondary connections are first established, and continues to be supplied until the transformer circuit is interrupted, regardless of the completion or interruption of the other transformer circuit in the meantime.

The circuit breakers 10a and 10b similarly control the connections between the transformers 4 and 5 and the secondary buses 7 and 8.

If, with the tie circuit breaker 21 and the circuit breaker 9a closed, one of the circuit breakers associated with the high-voltage bus 2, such as the circuit breaker 10a, is closed, an energizing circuit for the potential bus 18 is completed as follows: Upon closure of the circuit breaker 10a, a circuit is completed for the control relay 23 and the latter closes. Upon closure of the control relay 23, the second compensating device 11 from the top in the figure is connected to the potential bus 18, thereby completing the energizing circuit of the latter.

Assuming that, with the circuit breakers 9a and 10a closed, it is desired to remove the secondary bus 8 from service for making repairs or for other reasons, the tie circuit breaker 21 is opened. Upon the opening of the tie circuit breaker 21, the potential transformer 16 becomes deenergized, and the transfer relay 20 drops out. The transfer relay 20, in dropping out, however, establishes a connection from the potential transformer 15 to the potential bus 18, so that the latter remains energized proportionately to the voltage of the high-voltage bus 2.

Although, for simplicity, I have illustrated my invention in connection with single-phase circuits and apparatus, it will be understood that the invention is equally capable of polyphase applications.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current system of transmission and distribution, a high-voltage circuit, a plurality of transformers connected to said high voltage circuit, a plurality of low-voltage circuits connected to said transformers, a potential bus, a plurality of shunt mutual impedance elements energized from said low voltage circuits, a plurality of compensating series mutual impedance elements energized in accordance with current quantities of said transformers, and transfer means for controlling the energization of said potential bus from said mutual impedance elements, said transfer means being effective to establish a connection of said potential bus to a predetermined combination of one of said shunt elements and one of said compensating series elements under electrical conditions of said circuits such that said elements of said predetermined combination are energized, and to establish a connection of said potential bus to a different combination of one of said shunt elements and one of said compensating series elements under electrical conditions of said circuits such that the elements of said different combination are in a preferred condition of energization to the elements of said predetermined combination.

2. In an alternating-current system of transmission and distribution, a high-voltage circuit, a plurality of transformers connected to said high-voltage circuit, a plurality of low-voltage circuits connected to said transformers, a plurality of circuit breakers for controlling the power flow through said transformers, a potential bus, a plurality of shunt mutual impedance elements energized from said low-voltage circuits, a plurality of compensating series mutual impedance elements energized in accordance with current quantities of said transformers, and control means for connecting said potential bus to said mutual impedance elements, said control means being effective to establish a connection of said potential bus to a predetermined combination of one of said shunt elements and one of said compensating series elements when one or more of said circuit breakers is closed such as to establish energization of said elements of said predetermined combination, and to establish a connection of said potential bus to a different combination of one of said shunt elements and one of said compensating series elements when a different one or more of said circuit breakers is closed such that the elements of said different combination are energized and at least one of the elements of said predetermined combination is deenergized.

3. In an alternating-current system of transmission and distribution, a plurality of transformers, a plurality of shunt mutual impedance elements energized in accordance with voltage quantities of said transformers, a plurality of compensating series mutual impedance elements energized in accordance with current quantities of said transformers, a common connection of one terminal of all of said mutual impedance elements, a potential bus having a first conductor and a second conductor means for selectively connecting the free terminals of said shunt elements to said first conductor, and means for selectively connecting the free terminals of said compensating series elements to said second conductor.

4. In an alternating-current system of transmission and distribution, a high-voltage circuit, a pair of transformers connected to said high voltage circuit, a first low-voltage circuit connected to a first of said transformers, a second low-voltage circuit connected to the second of said transformers, a first shunt mutual impedance element energized from said first low-voltage circuit, a second shunt mutual impedance element energized from said second low-voltage circuit, a potential bus, compensating means for energizing said potential bus in accordance with a voltage loss of an energized one of said transformers, and transfer means effective to establish a connection of said first shunt mutual impedance element to said potential bus under predetermined electrical conditions of said circuits, and to establish a connection of said second shunt mutual impedance element to said potential bus when said first low-voltage circuit is deenergized.

5. In an alternating-current system of transmission and distribution, a high-voltage circuit, a first transformer and a second transformer connected to said high-voltage circuit, a potential bus, means for providing a main component of energization of said potential bus in accordance with a voltage condition derived from said transformers, a first series compensating device energized in accordance with a current condition of said first transformer, a second series compensating device energized in accordance with a current condition of said second transformer, a first circuit breaker for controlling the flow of power through said first transformer, a second circuit breaker for controlling the flow of power through said second transformer, and control means effective when said first circuit breaker is closed and said second circuit breaker is open for connecting said first compensating device to said potential bus, and effective when said first circuit breaker is open and said second circuit breaker is closed for connecting said second compensating device to said potential bus.

6. In an alternating-current system of transmission and distribution, a high-voltage circuit, a first transformer and a second transformer connected to said high-voltage circuit, a potential bus, means for providing a main component of energization of said potential bus in accordance with a voltage condition derived from said transformers, a first series compensating device energized in accordance with a current condition of said first transformer, a second series compensating device energized in accordance with a current condition of said second transformer, a first circuit breaker for controlling the flow of power through said first transformer, a second circuit breaker for controlling the flow of power through said second transformer, and control means effective when said first circuit breaker is closed and said second circuit is open for establishing a connection of said first compensating device to said potential bus and for maintaining said connection regardless of the open or closed condition of said second circuit breaker until said first circuit breaker is opened and for thereupon interrupting said connection and establishing a connection of said potential bus to said second compensating device.

EDWIN L. HARDER.